United States Patent
Sakhnini et al.

(10) Patent No.: US 11,979,752 B2
(45) Date of Patent: May 7, 2024

(54) BEAM SWITCHING IN A TIME DOMAIN

(71) Applicant: QUALCOMM Incorporated, San Diego, CA (US)

(72) Inventors: Iyab Issam Sakhnini, San Diego, CA (US); Tao Luo, San Diego, CA (US); Wanshi Chen, San Diego, CA (US); Yuchul Kim, San Diego, CA (US); Peter Gaal, San Diego, CA (US); Qiang Wu, San Diego, CA (US); Wooseok Nam, San Diego, CA (US); Hwan Joon Kwon, San Diego, CA (US); Juan Montojo, San Diego, CA (US); Jelena Damnjanovic, Del Mar, CA (US); Mahmoud Taherzadeh Boroujeni, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 96 days.

(21) Appl. No.: 17/302,522

(22) Filed: May 5, 2021

(65) Prior Publication Data
US 2021/0360433 A1    Nov. 18, 2021

Related U.S. Application Data

(60) Provisional application No. 63/024,213, filed on May 13, 2020.

(51) Int. Cl.
*H04W 16/28* (2009.01)
*H04W 72/044* (2023.01)
(Continued)

(52) U.S. Cl.
CPC ....... *H04W 16/28* (2013.01); *H04W 72/0446* (2013.01); *H04W 72/046* (2013.01); *H04W 72/23* (2023.01); *H04W 72/53* (2023.01)

(58) Field of Classification Search
CPC .............. H04W 16/28; H04W 72/042; H04W 72/0446; H04W 72/046; H04W 72/0493; H04W 72/1289; H04B 7/0695
(Continued)

(56) References Cited

U.S. PATENT DOCUMENTS

| | | | |
|---|---|---|---|
| 2011/0170492 A1* | 7/2011 | Taira | H04B 7/2643 370/328 |
| 2013/0051302 A1* | 2/2013 | Kim | H01Q 25/002 370/312 |

(Continued)

FOREIGN PATENT DOCUMENTS

| | | | | |
|---|---|---|---|---|
| CN | 111095817 A | * | 5/2020 | ........... H04B 7/0617 |
| WO | WO-2020057459 A1 | * | 3/2020 | ........... H04B 7/0621 |
| WO | WO-2020063532 A1 | * | 4/2020 | ........... H04B 7/0408 |

*Primary Examiner* — Hassan Kizou
*Assistant Examiner* — Oladiran Gideon Olaleye
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, information indicating a beam switching pattern that indicates beams that are to be used by the UE on a per communication basis in a time domain. The UE may communicate with the base station based at least in part on receiving the information indicating the beam switching pattern. Numerous other aspects are provided.

30 Claims, 5 Drawing Sheets

(51) Int. Cl.
*H04W 72/0446* (2023.01)
*H04W 72/23* (2023.01)
*H04W 72/53* (2023.01)

(58) Field of Classification Search
USPC .......................................................... 370/329
See application file for complete search history.

(56) References Cited

U.S. PATENT DOCUMENTS

| | | | |
|---|---|---|---|
| 2013/0051364 A1* | 2/2013 | Seol ...................... | H04W 16/28 |
| | | | 370/329 |
| 2013/0148571 A1* | 6/2013 | Miller ................ | H04B 7/18515 |
| | | | 370/316 |
| 2013/0279356 A1* | 10/2013 | Park .................... | H04B 7/0695 |
| | | | 370/252 |
| 2016/0150591 A1* | 5/2016 | Tarighat Mehrabani .................... | |
| | | | H04W 52/38 |
| | | | 370/329 |
| 2017/0303264 A1* | 10/2017 | Islam .................. | H04W 72/042 |
| 2017/0331670 A1* | 11/2017 | Parkvall .............. | H04W 52/0274 |
| 2017/0359826 A1* | 12/2017 | Islam .................. | H04B 7/0617 |
| 2018/0034611 A1* | 2/2018 | Nagaraja ............... | H04W 24/02 |
| 2018/0213528 A1* | 7/2018 | Lee .................. | H04W 72/0446 |
| 2018/0279287 A1* | 9/2018 | John Wilson ........ | H04B 7/0617 |
| 2019/0181935 A1* | 6/2019 | Karjalainen ......... | H04B 7/0617 |
| 2019/0222289 A1* | 7/2019 | John Wilson ......... | H04L 5/0053 |
| 2019/0261344 A1* | 8/2019 | Grant .................. | H04B 7/0617 |
| 2019/0268060 A1* | 8/2019 | Nam .................... | H04B 7/0695 |
| 2019/0281534 A1* | 9/2019 | Yu ....................... | H04J 11/0076 |
| 2019/0320471 A1* | 10/2019 | Ohara .................. | H04W 52/50 |
| 2019/0349065 A1* | 11/2019 | Zhang .................. | H04B 7/088 |
| 2020/0029260 A1* | 1/2020 | Kadiri .................. | H04W 36/08 |
| 2020/0204971 A1* | 6/2020 | Yasukawa ............... | H04W 4/40 |
| 2020/0288479 A1* | 9/2020 | Xi ......................... | H04W 76/27 |
| 2020/0313748 A1* | 10/2020 | Padhy .................. | H04B 7/088 |
| 2021/0036754 A1* | 2/2021 | Bengtsson ............ | H04B 7/088 |

* cited by examiner

BEAM SWITCHING IN A TIME DOMAIN

CROSS-REFERENCE TO RELATED APPLICATION

This patent application claims priority to U.S. Provisional Patent Application No. 63/024,213, filed on May 13, 2020, entitled "BEAM SWITCHING IN A TIME DOMAIN," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for beam switching in a time domain.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include receiving, from a base station, information indicating a beam switching pattern that indicates beams that are to be used by the UE on a per communication basis in a time domain; and communicating with the base station based at least in part on receiving the information indicating the beam switching pattern.

In some aspects, a method of wireless communication, performed by a base station, may include transmitting, to a UE, information indicating a beam switching pattern that indicates beams that are to be used by the UE on a per communication basis in a time domain; and communicating with the UE based at least in part on transmitting the information indicating the beam switching pattern.

In some aspects, a UE for wireless communication may include a memory and one or more processors coupled to the memory. The memory and the one or more processors may be configured to receive, from a base station, information indicating a beam switching pattern that indicates beams that are to be used by the UE on a per communication basis in a time domain; and communicate with the base station based at least in part on receiving the information indicating the beam switching pattern.

In some aspects, a base station for wireless communication may include a memory and one or more processors coupled to the memory. The memory and the one or more processors may be configured to transmit, to a UE, information indicating a beam switching pattern that indicates beams that are to be used by the UE on a per communication basis in a time domain; and communicate with the UE based at least in part on transmitting the information indicating the beam switching pattern.

In some aspects, a non-transitory computer-readable medium may store one or more instructions for wireless communication. The one or more instructions, when executed by one or more processors of a UE, may cause the one or more processors to receive, from a base station, information indicating a beam switching pattern that indicates beams that are to be used by the UE on a per communication basis in a time domain; and communicate with the base station based at least in part on receiving the information indicating the beam switching pattern.

In some aspects, a non-transitory computer-readable medium may store one or more instructions for wireless communication. The one or more instructions, when executed by one or more processors of a base station, may cause the one or more processors to transmit, to a UE, information indicating a beam switching pattern that indicates beams that are to be used by the UE on a per communication basis in a time domain; and communicate with the UE based at least in part on transmitting the information indicating the beam switching pattern.

In some aspects, an apparatus for wireless communication may include means for receiving, from a base station, information indicating a beam switching pattern that indicates beams that are to be used by the apparatus on a per communication basis in a time domain; and means for communicating with the base station based at least in part on receiving the information indicating the beam switching pattern.

In some aspects, an apparatus for wireless communication may include means for transmitting, to a UE, information indicating a beam switching pattern that indicates beams that are to be used by the UE on a per communication basis in a time domain; and means for communicating with the UE based at least in part on transmitting the information indicating the beam switching pattern.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
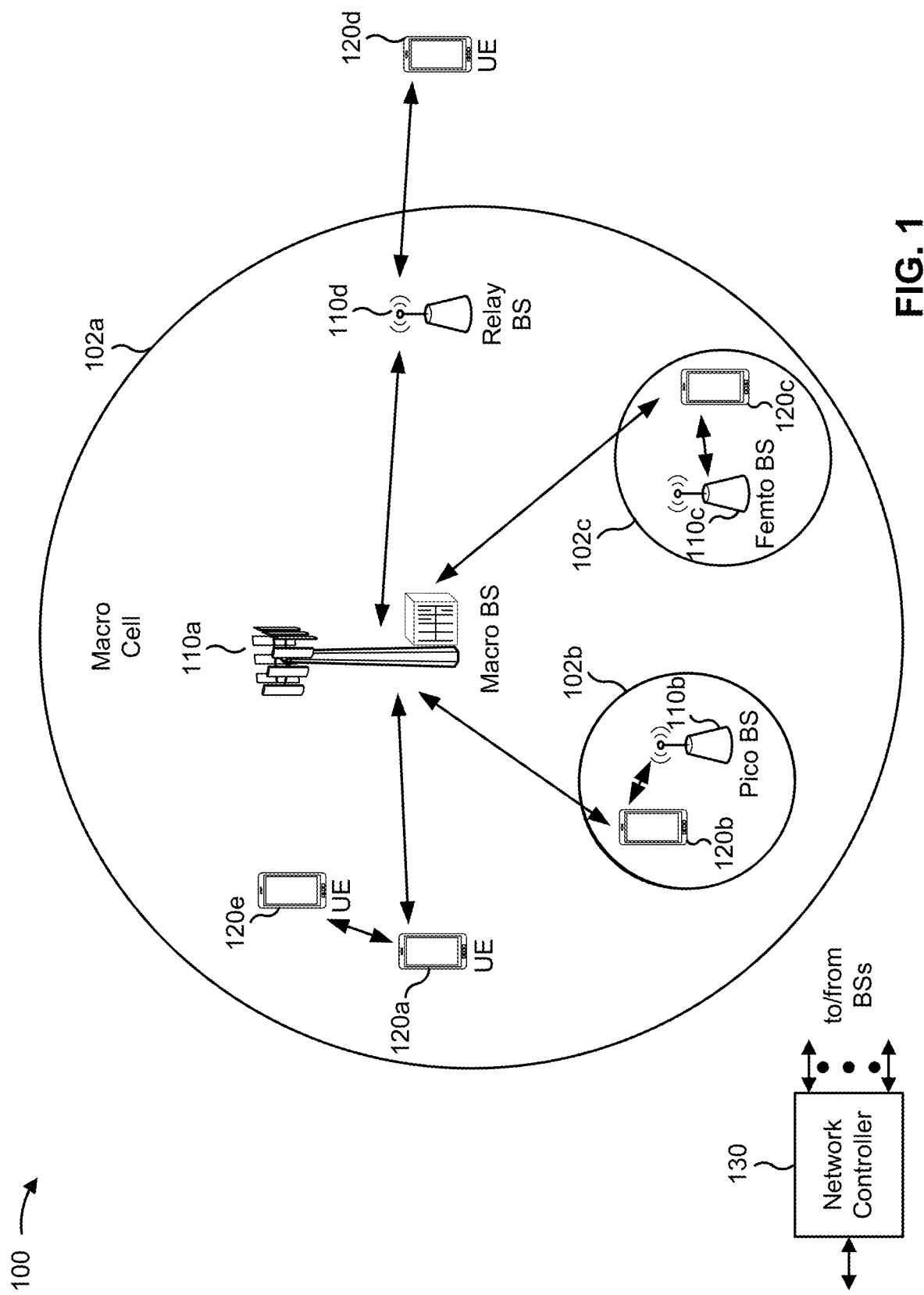
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band.

Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
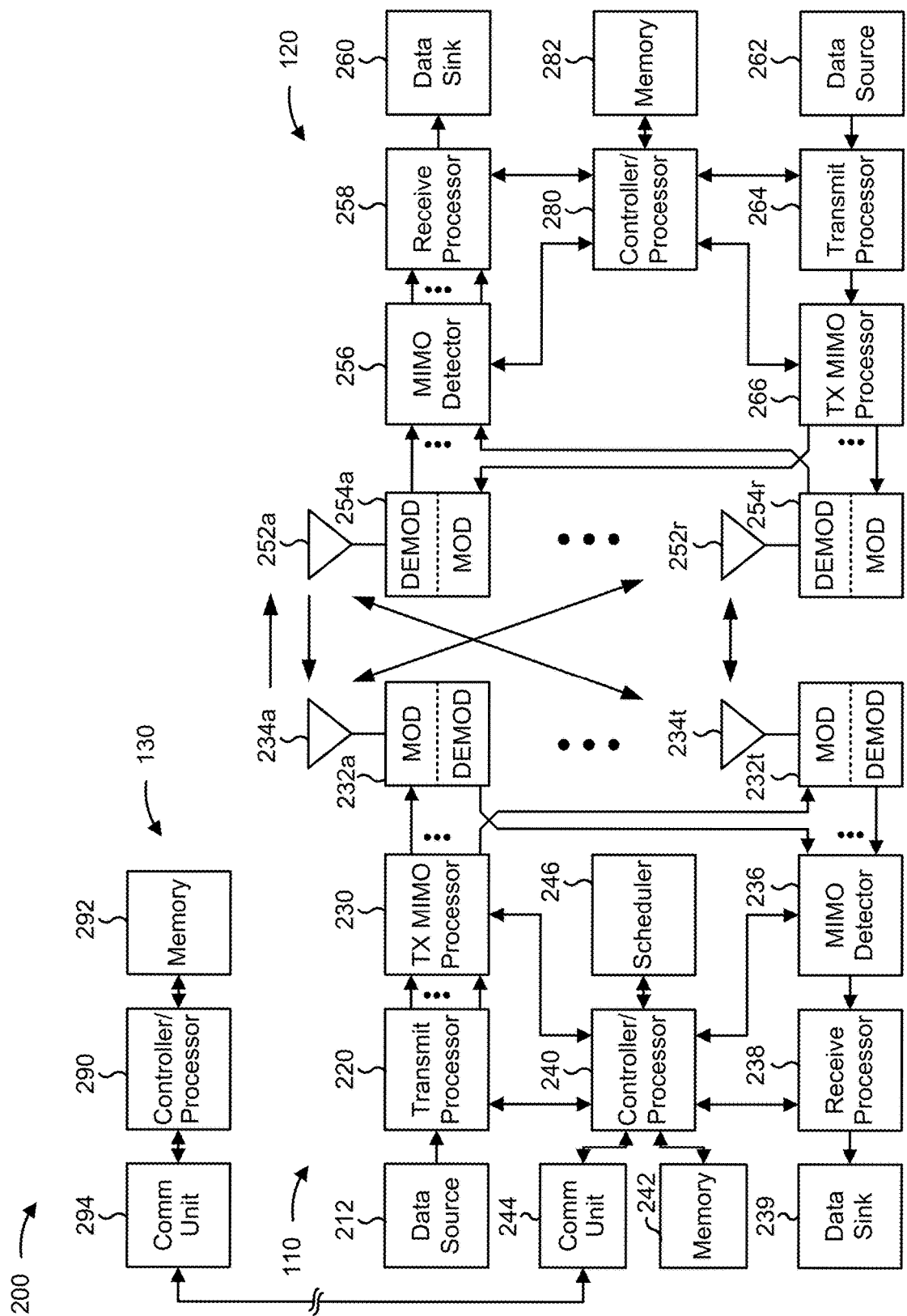
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-5).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-5).

Controller/processor 240 of base station 110, controller/processor 280 of UE 120, and/or any other component(s) of FIG. 2 may perform one or more techniques associated with beam switching in a time domain, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, and/or other processes as described herein. In some aspects, executing instructions may include running the instructions, converting the instructions, compiling the instructions, and/or interpreting the instructions, among other examples.

In some aspects, UE 120 may include means for receiving, from a base station, information indicating a beam switching pattern that indicates beams that are to be used by the UE 120 on a per communication basis in a time domain, means for communicating with the base station based at least in part on receiving the information indicating the beam switching pattern, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a UE (e.g., UE 120), information indicating a beam switching pattern that indicates beams that are to be used by the UE on a per communication basis in a time domain, means for communicating with the UE based at least in part on transmitting the information indicating the beam switching pattern, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A wireless device may be a reduced-capability UE (which may also be referred to as a reduced-capability NR device). A reduced-capability UE may be a device having reduced or lower capabilities relative to other UEs. For example, a reduced-capability UE may be equipped with fewer transmit and/or receive antennas, may be equipped with a lower-capability battery, may be equipped with fewer processing and/or memory resources (which may result in longer processing timelines), may only be capable of monitoring and/or processing a reduced frequency bandwidth, may only be capable of half-duplex frequency division duplexing, and/or the like. Examples of reduced-capability UEs may include an IoT device, biometric sensors/devices, smart watches, smart clothing, smart glasses, smart wrist bands, smart jewelry, vehicular components or sensors (e.g., cellular-enabled onboard diagnostic (OBD) devices), smart meters/sensors, and/or the like.

A reduced-capability UE may be stationary (e.g., mounted, or otherwise located, at a permanent or semi-permanent location). For example, a wireless sensor for industrial use, a video surveillance device, and/or the like, may be considered stationary UEs (e.g., stationary devices). Stationary UEs within the coverage of a base station may cause various issues. For example, the stationary UEs may not be uniformly distributed in the coverage area of the base station, such that some beams for communicating with the base station are used by too many UEs and are overloaded. Moreover, the stationary UEs may experience persistent interference (e.g., inter-beam interference or intra-beam interference) because the stationary UEs cannot move to a location with less congestion.

In some cases, a base station may use dynamic signaling (e.g., downlink control information (DCI)) to control the distribution of stationary UEs across beams, and thereby improve beam utilization and interference. However, dynamic signaling may cause excessive signaling overhead and power consumption (e.g., when a stationary UE is communicating according to semi-persistent scheduling or a configured grant, and therefore the interference from other UEs on a beam is predictable). Moreover, the use of dynamic signaling to control the distribution of stationary UEs across beams may not sufficiently, or efficiently, address persistent interference experienced by stationary UEs. Furthermore, the base station may not have current information, such as current layer 1 (L1) measurements, needed to effectively control the distribution of stationary UEs across beams.

Additionally, beam assignment (e.g., transmission configuration indicator (TCI) updates) by dynamic signaling is not instantaneous and is subject to delays. For example, there may be a delay between when a UE receives DCI that indicates a beam (e.g., indicates a TCI), and when the indicated beam is used by the UE to receive a physical downlink shared channel (PDSCH). As another example, there may be a delay between when a UE receive a medium access control (MAC) control element (MAC-CE) that activates a beam (e.g., activates a TCI state), and when the activated beam is used by the UE to receive a physical downlink control channel (PDCCH). Such delays may further constrain the use of dynamic signaling to control the distribution of stationary UEs across beams. Moreover, it may not be possible for a UE to switch to a beam in the same slot in which the beam is indicated for the UE by dynamic signaling (e.g., it may not be possible for a scheduling offset value in DCI, such as a k0 value, to have a value of zero), thereby causing further delays associated with the use of dynamic signaling to control the distribution of stationary UEs across beams.

Some techniques and apparatuses described herein enable configuration of a beam switching pattern (e.g., a beam hopping pattern) for a stationary UE. In some aspects, the beam switching pattern may indicate beams that are to be used by the stationary UE in a time domain. For example, the beam switching pattern may indicate beams that are to be used by the stationary UE on a per communication basis (e.g., a per message basis) in the time domain. As an example, a first beam indicated by the beam switching pattern may be used for a first communication in time, a second beam indicated by the beam switching pattern may be used for a second communication in time, and so forth. In this way, the distribution of stationary UEs across beams may be improved (e.g., more uniform), thereby improving beam utilization and interference. Furthermore, the beam switching patterns may be configured for the stationary UEs with reduced signaling overhead relative to dynamic signaling.

Figure 3:
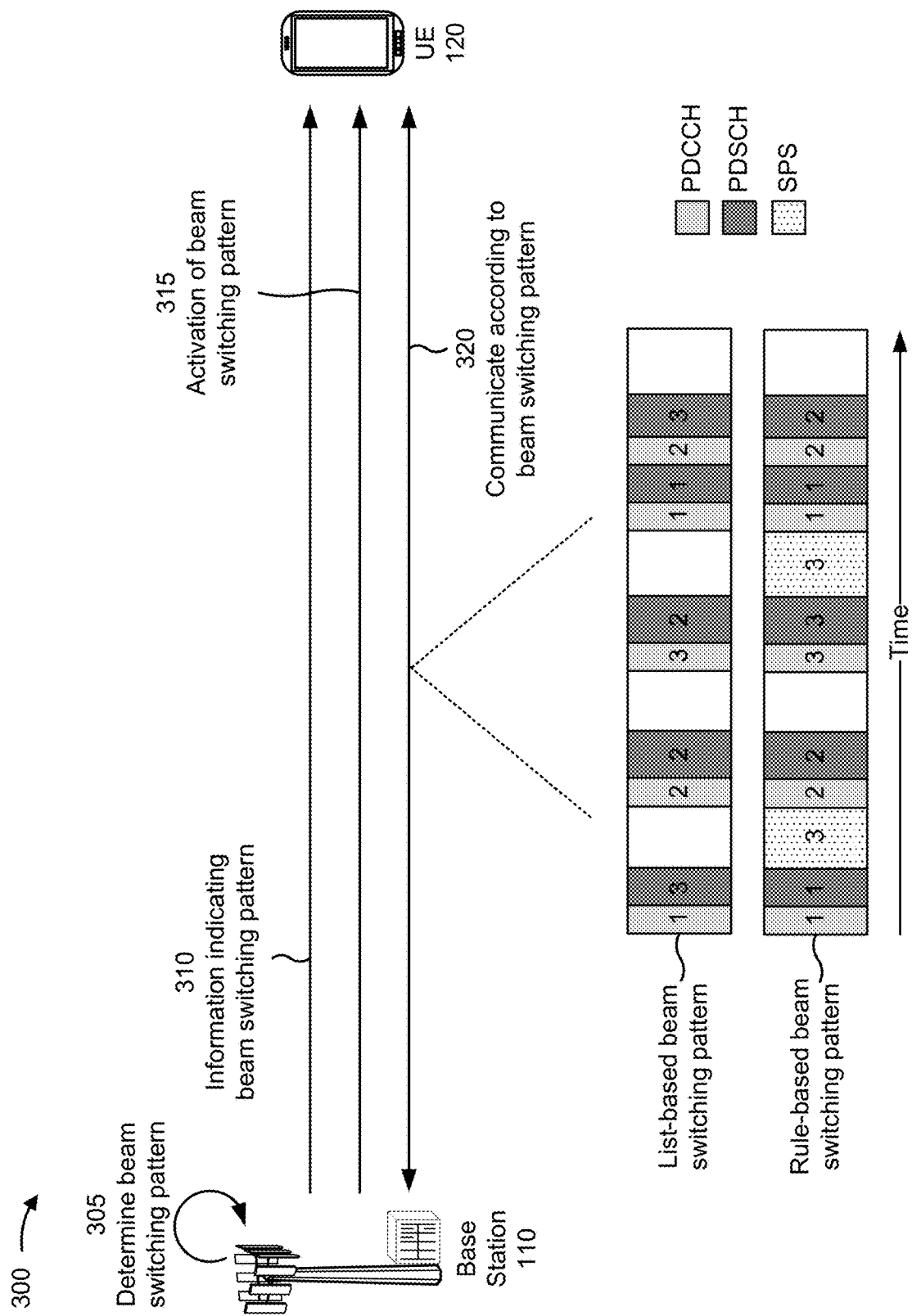
FIG. 3 is a diagram illustrating an example of beam switching in a time domain, in accordance with the present disclosure.

FIG. 3 is a diagram illustrating an example 300 of beam switching in a time domain, in accordance with the present disclosure. As shown in FIG. 3, a base station 110 and a UE 120 may communicate with one another. In some aspects, the UE 120 may be a stationary UE (e.g., the UE 120 may be a reduced-capability UE and/or located in a permanent or semi-permanent location). In some aspects, the UE 120 may be one of a plurality of stationary UEs within a coverage of the base station 110.

As shown by reference number 305, the base station 110 may determine a beam switching pattern (e.g., a beam hopping pattern) for use by the UE 120. In some aspects, the base station 110 may determine the beam switching pattern based at least in part on measurements (e.g., L1 measurements, such as L1-RSRP) reported by the UE 120 (e.g., the base station 110 may determine the beam switching pattern so as to improve L1-RSRP). Additionally, or alternatively, the base station 110 may determine the beam switching pattern based at least in part on a distribution of UEs (e.g., a beam load) on one or more beams (e.g., the base station 110 may determine the beam switching pattern so as to more evenly distribute UEs on the one or more beams). Additionally, or alternatively, the base station 110 may determine the beam switching pattern based at least in part on interference (e.g., uplink interference) measurements determined by the base station 110 (e.g., the base station 110 may determine the beam switching pattern so as to reduce interference).

In some aspects, the UE 120 may transmit, and the base station 110 may receive, a request to use a particular beam switching pattern. In some aspects, the UE 120 may define a beam switching pattern, and the UE 120 may indicate the defined beam switching pattern in the request. In some aspects, the UE 120 may be configured (e.g., via radio resource control (RRC) signaling) with one or more beam switching patterns, the UE 120 may determine (e.g., select) a beam switching pattern from the one or more beam switching patterns, and the UE 120 may indicate the determined beam switching pattern in the request. In some aspects, the UE 120 may define or determine a beam switching pattern based at least in part on interference (e.g., downlink interference) measurements determined by the UE 120 (e.g., the UE 120 may define or determine the beam switching pattern so as to reduce interference).

In some aspects, the base station 110 may determine the beam switching pattern for use by the UE 120 based at least in part on the request transmitted by the UE 120. For example, the base station 110 may determine to accept the beam switching pattern recommended by the UE 120 in the request. Alternatively, the base station 110 may determine that the beam switching pattern recommended by the UE 120 in the request is not to be used, and may determine the beam switching pattern for use by the UE 120, as described above.

As shown by reference number 310, the base station 110 may transmit, and the UE 120 may receive, information indicating the beam switching pattern determined by the base station 110 (e.g., a configuration for the beam switching pattern, an indication of the beam switching pattern, a confirmation of a requested beam switching pattern, and/or the like). The base station 110 may transmit the information via RRC signaling, a MAC-CE, DCI, and/or the like.

In some aspects, the information indicating the beam switching pattern may indicate beams that are to be used by the UE 120 on a per communication basis (e.g., a per message basis) in a time domain. For example, the UE 120 may use a first beam for a first communication in time, a second beam for a second communication in time, and so forth, according to the beam switching pattern. In some aspects, the information indicating the beam switching pattern may indicate downlink beams (e.g., downlink TCI states) that the UE 120 is to use to receive PDCCH communications and/or PDSCH communications. In some aspects, the information indicating the beam switching pattern may indicate uplink beams that the UE 120 is to use to transmit physical uplink control channel (PUCCH) communications, physical uplink shared channel (PUSCH) communications, physical random access channel (PRACH) communications, and/or sounding reference signals (SRSs).

In some aspects, the information indicating the beam switching pattern may indicate a list (e.g., a chronological list) of beam indications (e.g., TCIs) that are to be respectively used for communications (e.g., messages) of the UE 120 in a time domain. For example, a first beam indicated by the list may be used for a first communication in time, a second beam indicated by the list may be used for a second communication in time, and so forth.

In some aspects, information indicating the beam switching pattern may indicate one or more rules that enable the UE 120 to determine a particular beam that is to be used for a particular communication (e.g., the one or more rules implicitly identify the beam switching pattern). For example, the one or more rules may indicate that a first type of communication is to use a first beam, a second type of communication is to use a second beam, and so forth. As an example, the one or more rules may indicate that communications associated with semi-persistent scheduling (SPS) are to use a particular beam, communications associated with a configured grant are to use another particular beam, and/or the like.

In some aspects, the information indicating the beam switching pattern may indicate that a set of communications are to use the same beam (e.g., a list of beam indications may be configured so that the set of communications use the same beam, or the one or more rules may indicate that the set of communications use the same beam). For example, the set of communications may be a PDSCH communication and the PDCCH communication that scheduled (e.g., dynamically scheduled) the PDSCH communication, the set of communications may be a PUSCH communication and the PDCCH communication that scheduled (e.g., dynamically scheduled) the PUSCH communication, the set of communications may be repetitions of a communication (e.g., a PDSCH communication or a PUSCH communication), and/or the like.

In some aspects, the information indicating the beam switching pattern, or another indication, may indicate a default beam (e.g., an anchor beam) among the beams used for the beam switching pattern. The UE 120 may revert to using the default beam upon expiration of an inactivity timer of the UE 120. Additionally, or alternatively, the UE 120 may revert to using the default beam at one or more configured times. In this case, the UE 120 may perform measurements using the default beam, may transmit or receive a particular message (e.g., a message associated with a radio link management or radio resource management procedure) using the default beam, and/or the like.

As shown by reference number 315, the base station 110 may transmit, and the UE 120 may receive, an indication that the beam switching pattern is to be activated by the UE 120. Similarly, the base station 110 also may transmit an indication to deactivate the beam switching pattern (e.g., if the beam switching pattern was previously activated and is no longer to be used). The base station 110 may transmit the indication to activate (or deactivate) the beam switching pattern via RRC signaling, a MAC-CE, and/or DCI. In some aspects, the DCI may be specific to the UE 120, or may be group-common DCI.

In some aspects, the UE 120 may transmit, and the base station 110 may receive, a request to activate the beam switching pattern (e.g., if the UE 120 determines that interference can be reduced by use of the beam switching pattern). Similarly, the UE 120 may transmit a request to deactivate the beam switching pattern (e.g., if the beam switching pattern was previously activated and is no longer to be used). In some aspects, the base station 110 may transmit the indication to activate (or deactivate) the beam switching pattern based at least in part on the request transmitted by the UE 120.

In some aspects, the UE 120 may determine (e.g., without the indication from the base station 110) to activate or deactivate the beam switching pattern based at least in part on one or more rules for activating or deactivating the beam switching pattern. For example, the UE 120 may determine to activate the beam switching pattern based at least in part on a rule that the beam switching pattern is to be activated when an interference measurement taken by the UE 120 satisfies a threshold value. The UE 120 may be configured with the one or more rules via RRC signaling.

The UE 120 may begin to use (e.g., the UE 120 may begin to apply) the beam switching pattern after a time period from an activation event associated with activating the beam switching pattern. The UE 120 may be provisioned with the time period, configured with the time period (e.g., via RRC signaling), and/or the time period may be indicated to the UE 120 (e.g., in DCI). In some aspects, the time period may be based at least in part on a capability of the UE 120. For example, the time period may be relatively longer if the UE 120 has a relatively lower processing capability. In some aspects, the activation event may be the UE 120 receiving DCI that activates the beam switching pattern. In some aspects, the activation event may be the UE 120 transmitting acknowledgment feedback (e.g., in a PUCCH) for a MAC-CE that activates the beam switching pattern.

In some aspects, the base station 110 may transmit, and the UE 120 may receive, DCI that activates the beam switching pattern. For example, a TCI field of the DCI may include an indicator that the beam switching pattern is to be used by the UE 120. Alternatively, the TCI field may include an indicator that a particular beam is to be used by the UE 120. An indicator may be a TCI codepoint (e.g., a TCI codepoint of up to eight TCI codepoints that may be configured for the UE 120). Accordingly, an indicator (e.g., a TCI codepoint, such as a value of 1) may indicate that the beam switching pattern is to be used, and other indicators (e.g., other TCI codepoints, such as values 2-8) may respectively indicate particular beams that are to be used.

As shown by reference number 320, the base station 110 and the UE 120 may communicate according to the beam switching pattern. For example, the UE 120 may use beams (e.g., beam hops) according to the beam switching pattern on a per communication basis in a time domain. As an example, the UE 120 may use (e.g., receive on or transmit on) a first beam for a first communication in time (e.g., in one or more first symbols), use a second beam for a second communication in time (e.g., in one or more second symbols), and so forth, according to the beam switching pattern.

In one example, FIG. 3 shows downlink communication according to a list-based beam switching pattern, as described above. As shown, a list of beams for the beam switching pattern may indicate (e.g., in order) beam 1, beam 3, beam 2, beam 2, and so forth. Accordingly, the UE 120 may use beam 1 for a first communication in time, use beam 3 for a second communication in time, use beam 2 for a third communication in time, use beam 2 for a fourth communication in time, and so forth.

In another example, FIG. 3 shows downlink communication according to a rule-based beam switching pattern, as described above. As shown, a rule may indicate that SPS communications are to use beam 3, and another rule may indicate that sets of communications, which include a PDSCH and a PDCCH that schedules the PDSCH, are to use the same beam. Accordingly, the UE 120 may use the same beam (e.g., beam 1) for the first and second communications in time (e.g., a PDCCH and a PDSCH scheduled by the PDCCH), beam 3 for the third communication in time (e.g., an SPS communication), and so forth.

In some aspects, the UE 120 may perform one or more operations (e.g., while communicating with the base station 110). The one or more operations may be associated with procedures or processes of the UE 120 (e.g., hybrid automatic repeat request (HARD) processes, radio link management procedures, and/or the like), measurements performed by the UE 120 (e.g., measurements associated with radio resource management operations, and/or the like), timers used by the UE 120 (e.g., timers associated with beam failure detection operations, beam failure recovery operations, and/or the like), and/or the like.

In some aspects, the UE 120 may perform the one or more operations independent of (e.g., without regard to or transparent to) the beam switches of the beam switching pattern. For example, the different beams used for the beam switching pattern may be associated with a single HARQ process. In some aspects, the UE 120 may perform the one or more operations respectively for (e.g., the one or more operations may be maintained separately for) the beam switches of the beam switching pattern. For example, the different beams used for the beam switching pattern may be associated with respective HARQ processes. The UE 120 may perform the one or more operations respectively for the different beams when the different beams are associated with different beam measurements (and therefore associated with different operational qualities).

In some aspects, the base station 110 may transmit, and the UE 120 may receive, an indication of whether the UE 120 is to perform the one or more operations independent of the beam switches of the beam switching pattern, or is to perform the one or more operations respectively for the beam switches of the beam switching pattern. In some aspects, the indication may indicate which operations are to be performed independently, and/or which operations are to be performed respectively, for the beam switches of the beam switching pattern.

In some aspects, the base station 110 may indicate a particular beam that is to be used by the UE 120 (e.g., while the beam switching pattern is activated for the UE 120). For example, the base station 110 may transmit an indication (e.g., in DCI) of a particular beam that the UE 120 is to use to receive a PDSCH communication (e.g., a dynamically scheduled PDSCH communication). In this case, the UE 120 may determine whether to receive the PDSCH using the indicated beam or using a beam according to the beam switching pattern. The determination may be based at least in part on whether a scheduling offset associated with the PDSCH (e.g., a k0 value that indicates a timing between a downlink grant and reception of a corresponding downlink data communication) satisfies a threshold value (e.g., a time duration for the UE 120 to apply quasi co-location (QCL) information (e.g., timeDurationForQCL)). The UE 120 may use a beam according to the beam switching pattern when the scheduling offset is less than the threshold value (e.g., k0<timeDurationForQCL). The UE 120 may use the indicated beam when the scheduling offset is not less than the threshold value (e.g., k0≥timeDurationForQCL).

As another example, the base station 110 may transmit an indication (e.g., in a MAC-CE) of a particular beam that the UE 120 is to use to receive a PDCCH communication. In this case, the UE 120 may determine whether to receive the PDCCH using the indicated beam or using a beam according to the beam switching pattern. The determination may be based at least in part on whether a time period for transmitting acknowledgment feedback for the indication (e.g., for the MAC-CE) satisfies a threshold value (e.g., 3 milliseconds). The UE 120 may use a beam according to the beam switching pattern when the time period for transmitting acknowledgment feedback is less than the threshold value. The UE 120 may use the indicated beam when the time period for transmitting acknowledgment feedback is not less than the threshold value.

As indicated above, FIG. 3 is provided as an example. Other examples may differ from what is described with respect to FIG. 3.

Figure 4:
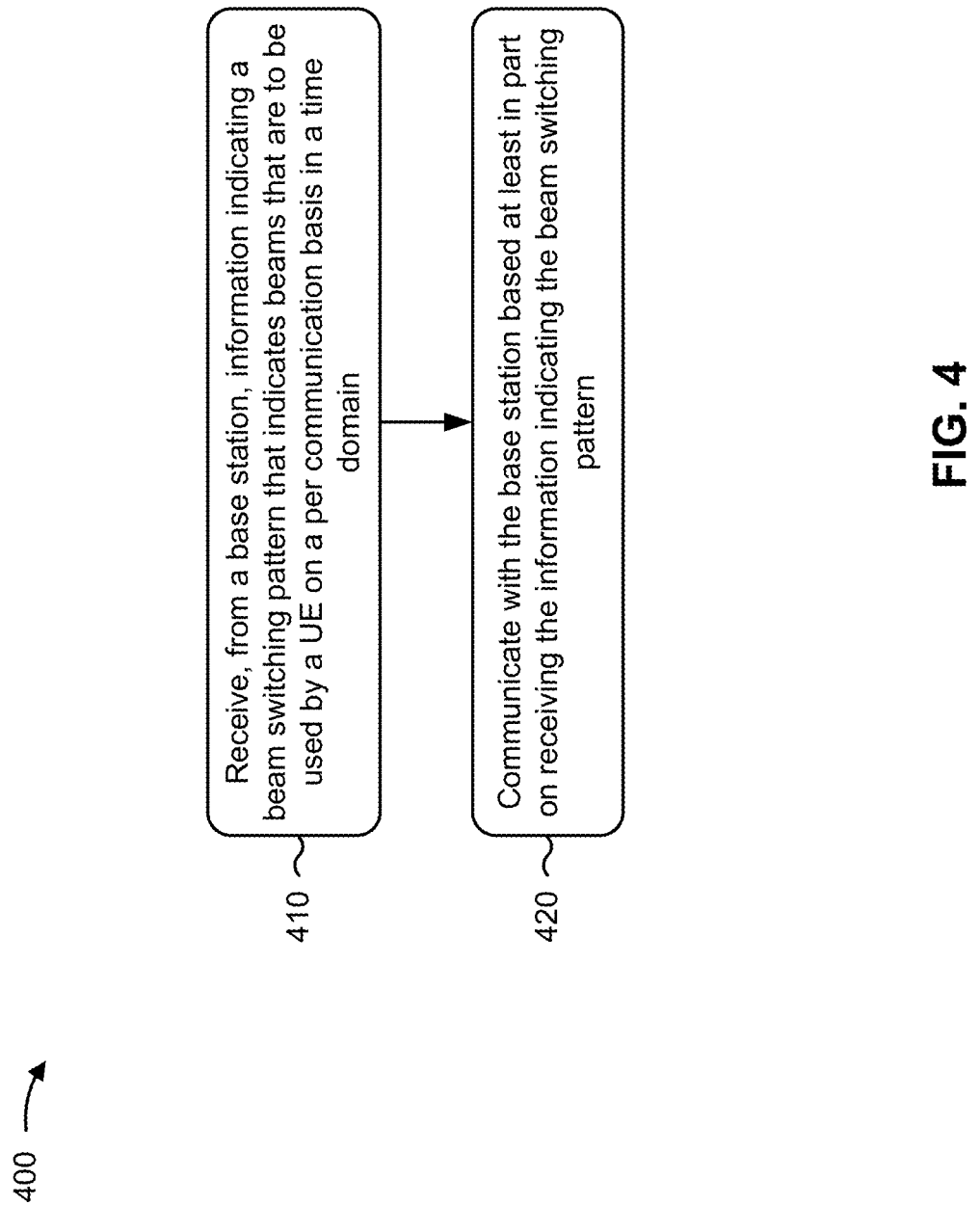
FIG. 4 is a diagram illustrating an example process performed, for example, by a UE, in accordance with the present disclosure.

FIG. 4 is a diagram illustrating an example process 400 performed, for example, by a UE, in accordance with the present disclosure. Example process 400 is an example where the UE (e.g., UE 120 and/or the like) performs operations associated with beam switching in a time domain.

As shown in FIG. 4, in some aspects, process 400 may include receiving, from a base station, information indicating a beam switching pattern that indicates beams that are to be used by the UE on a per communication basis in a time domain (block 410). For example, the UE (e.g., using antenna 252, DEMOD 254, MIMO detector 256, receive processor 258, controller/processor 280, and/or the like) may receive, from a base station, information indicating a beam switching pattern that indicates beams that are to be used by the UE on a per communication basis in a time domain, as described above.

As further shown in FIG. 4, in some aspects, process 400 may include communicating with the base station based at least in part on receiving the information indicating the beam switching pattern (block 420). For example, the UE (e.g., using antenna 252, DEMOD 254, MIMO detector 256, receive processor 258, controller/processor 280, transmit processor 264, TX MIMO processor 266, MOD 254, and/or the like) may communicate with the base station based at least in part on receiving the information indicating the beam switching pattern, as described above.

Process 400 may include additional aspects, such as any single aspect or any combination of aspects described below and/or in connection with one or more other processes described elsewhere herein.

In a first aspect, the information indicating the beam switching pattern indicates a list of beam indications that are to be respectively used for communications in the time domain.

In a second aspect, alone or in combination with the first aspect, process 400 includes transmitting a request to use the beam switching pattern, and the information indicating the beam switching pattern is received based at least in part on transmitting the request to use the beam switching pattern.

In a third aspect, alone or in combination with one or more of the first and second aspects, the information indicating the beam switching pattern indicates one or more rules for determining a particular beam that is to be used for a particular communication.

In a fourth aspect, alone or in combination with one or more of the first through third aspects, the information indicating the beam switching pattern indicates that a set of communications are to use a same beam.

In a fifth aspect, alone or in combination with one or more of the first through fourth aspects, process 400 includes receiving an indication that the beam switching pattern is to be activated for communicating with the base station.

In a sixth aspect, alone or in combination with one or more of the first through fifth aspects, process 400 includes transmitting a request to activate the beam switching pattern, and receiving an indication that the beam switching pattern is to be activated for communicating with the base station based at least in part on transmitting the request.

In a seventh aspect, alone or in combination with one or more of the first through sixth aspects, process 400 includes determining, based at least in part on one or more rules, that the beam switching pattern is to be activated for communicating with the base station.

In an eighth aspect, alone or in combination with one or more of the first through seventh aspects, the beam switching pattern is to be used after a time period from an activation event for the beam switching pattern.

In a ninth aspect, alone or in combination with one or more of the first through eighth aspects, the activation event is reception of downlink control information activating the beam switching pattern.

In a tenth aspect, alone or in combination with one or more of the first through ninth aspects, the activation event is transmission of acknowledgment feedback for a medium access control control element (MAC-CE) activating the beam switching pattern.

In an eleventh aspect, alone or in combination with one or more of the first through tenth aspects, one or more operations of the UE are to be performed independently of different beams used for the beam switching pattern.

In a twelfth aspect, alone or in combination with one or more of the first through eleventh aspects, one or more operations of the UE are to be respectively performed for different beams used for the beam switching pattern.

In a thirteenth aspect, alone or in combination with one or more of the first through twelfth aspects, a particular beam used for the beam switching pattern is a default beam.

In a fourteenth aspect, alone or in combination with one or more of the first through thirteenth aspects, communicating with the base station includes communicating with the base station using a default beam when an inactivity timer expires or at a configured time.

In a fifteenth aspect, alone or in combination with one or more of the first through fourteenth aspects, process 400 includes receiving an indication of a beam that is to be used for receiving a downlink data communication, and receiving the downlink data communication using the beam, or using another beam according to the beam switching pattern, based at least in part on whether a scheduling offset associated with the downlink data communication satisfies a threshold value.

In a sixteenth aspect, alone or in combination with one or more of the first through fifteenth aspects, process 400 includes receiving an indication of a beam that is to be used for receiving a downlink control communication, and receiving the downlink control communication using the beam, or using another beam according to the beam switching pattern, based at least in part on whether a time period for transmitting acknowledgment feedback for the indication satisfies a threshold value.

In a seventeenth aspect, alone or in combination with one or more of the first through sixteenth aspects, process 400 includes receiving downlink control information that includes an indicator, in a transmission configuration indicator field, that indicates whether the beam switching pattern or a particular beam is to be used for communicating with the base station.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
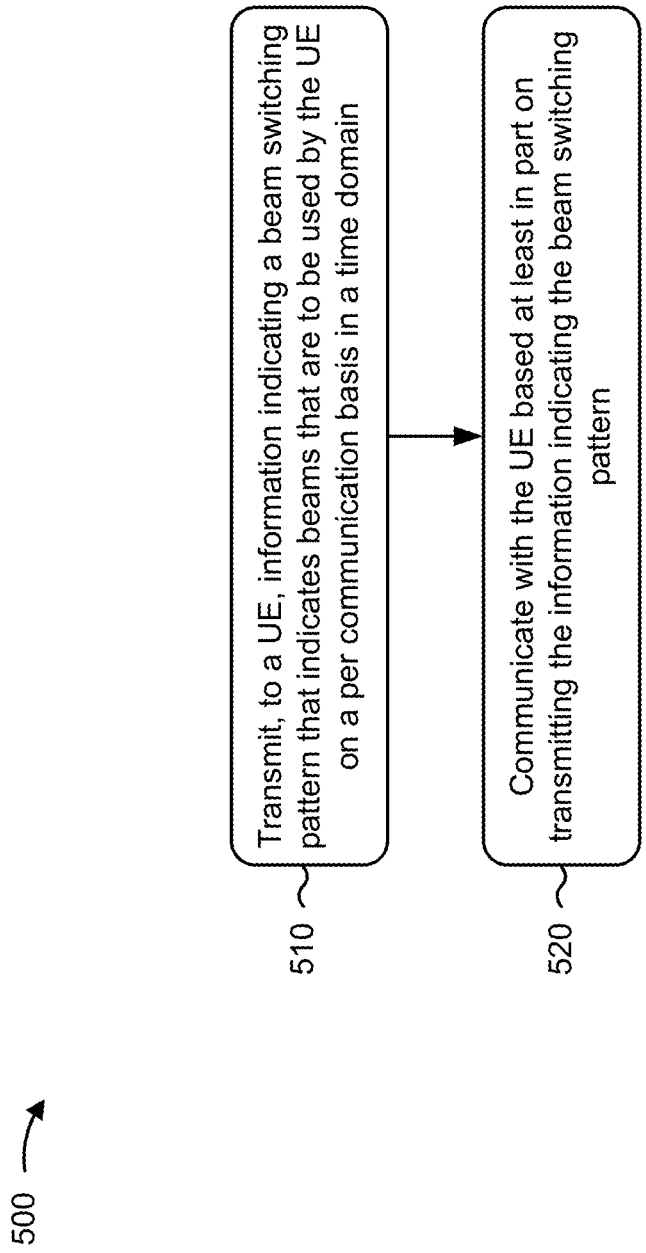
FIG. 5 is a diagram illustrating an example process performed, for example, by a base station, in accordance with the present disclosure.

FIG. 5 is a diagram illustrating an example process 500 performed, for example, by a base station, in accordance with the present disclosure. Example process 500 is an example where the base station (e.g., base station 110 and/or the like) performs operations associated with beam switching in a time domain.

As shown in FIG. 5, in some aspects, process 500 may include transmitting, to a UE, information indicating a beam switching pattern that indicates beams that are to be used by the UE on a per communication basis in a time domain (block 510). For example, the base station (e.g., using controller/processor 240, transmit processor 220, TX MIMO processor 230, MOD 232, antenna 234, and/or the like) may transmit, to a UE, information indicating a beam switching pattern that indicates beams that are to be used by the UE on a per communication basis in a time domain, as described above.

As further shown in FIG. 5, in some aspects, process 500 may include communicating with the UE based at least in part on transmitting the information indicating the beam switching pattern (block 520). For example, the base station (e.g., using controller/processor 240, transmit processor 220, TX MIMO processor 230, MOD 232, antenna 234, DEMOD 232, MIMO detector 236, receive processor 238, controller/processor 240, and/or the like) may communicate with the UE based at least in part on transmitting the information indicating the beam switching pattern, as described above.

Process 500 may include additional aspects, such as any single aspect or any combination of aspects described below and/or in connection with one or more other processes described elsewhere herein.

In a first aspect, the information indicating the beam switching pattern indicates a list of beam indications that are to be respectively used for communications in the time domain.

In a second aspect, alone or in combination with the first aspect, process 500 includes receiving a request to use the beam switching pattern, and the information indicating the beam switching pattern is transmitted based at least in part on receiving the request to use the beam switching pattern.

In a third aspect, alone or in combination with one or more of the first and second aspects, the information indicating the beam switching pattern indicates one or more rules for determining a particular beam that is to be used for a particular communication.

In a fourth aspect, alone or in combination with one or more of the first through third aspects, the information indicating the beam switching pattern indicates that a set of communications are to use a same beam.

In a fifth aspect, alone or in combination with one or more of the first through fourth aspects, process 500 includes transmitting an indication that the beam switching pattern is to be activated by the UE for communicating with the base station.

In a sixth aspect, alone or in combination with one or more of the first through fifth aspects, process 500 includes receiving a request to activate the beam switching pattern, and transmitting an indication that the beam switching pattern is to be activated by the UE for communicating with the base station based at least in part on receiving the request.

In a seventh aspect, alone or in combination with one or more of the first through sixth aspects, process 500 includes transmitting one or more rules for determining that the beam switching pattern is to be activated by the UE for communicating with the base station.

In an eighth aspect, alone or in combination with one or more of the first through seventh aspects, the beam switching pattern is to be used by the UE after a time period from an activation event for the beam switching pattern.

In a ninth aspect, alone or in combination with one or more of the first through eighth aspects, the activation event is reception by the UE of downlink control information activating the beam switching pattern.

In a tenth aspect, alone or in combination with one or more of the first through ninth aspects, the activation event is transmission by the UE of acknowledgment feedback for a medium access control control element (MAC-CE) activating the beam switching pattern.

In an eleventh aspect, alone or in combination with one or more of the first through tenth aspects, one or more operations of the UE are to be performed independently of different beams used for the beam switching pattern.

In a twelfth aspect, alone or in combination with one or more of the first through eleventh aspects, one or more operations of the UE are to be respectively performed for different beams used for the beam switching pattern.

In a thirteenth aspect, alone or in combination with one or more of the first through twelfth aspects, a particular beam used for the beam switching pattern is a default beam.

In a fourteenth aspect, alone or in combination with one or more of the first through thirteenth aspects, communicating with the UE includes communicating with the UE using a default beam when an inactivity timer expires or at a configured time.

In a fifteenth aspect, alone or in combination with one or more of the first through fourteenth aspects, process 500 includes transmitting an indication of a beam that is to be used by the UE for receiving a downlink data communication, and transmitting the downlink data communication according to the beam, or according to the beam switching pattern, based at least in part on whether a scheduling offset associated with the downlink data communication satisfies a threshold value.

In a sixteenth aspect, alone or in combination with one or more of the first through fifteenth aspects, process 500 includes transmitting an indication of a beam that is to be used by the UE for receiving a downlink control communication, and transmitting the downlink control communication according to the beam, or according to the beam switching pattern, based at least in part on whether a time period for transmitting acknowledgment feedback for the indication satisfies a threshold value.

In a seventeenth aspect, alone or in combination with one or more of the first through sixteenth aspects, process 500 includes transmitting downlink control information that includes an indicator, in a transmission configuration indicator field, that indicates whether the beam switching pattern or a particular beam is to be used by the UE for communicating with the base station.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The following provides an overview of some Aspects of the present disclosure:

Aspect 1: A method of wireless communication performed by a user equipment (UE), comprising: receiving, from a base station, information indicating a beam switching pattern that indicates beams that are to be used by the UE on a per communication basis in a time domain; and communicating with the base station based at least in part on receiving the information indicating the beam switching pattern.

Aspect 2: The method of Aspect 1, wherein the information indicating the beam switching pattern indicates a list of beam indications that are to be respectively used for communications in the time domain.

Aspect 3: The method of any of Aspects 1-2, further comprising: transmitting a request to use the beam switching pattern, wherein the information indicating the beam switching pattern is received based at least in part on transmitting the request to use the beam switching pattern.

Aspect 4: The method of any of Aspects 1-3, wherein the information indicating the beam switching pattern indicates one or more rules for determining a particular beam that is to be used for a particular communication.

Aspect 5: The method of any of Aspects 1-4, wherein the information indicating the beam switching pattern indicates that a set of communications are to use a same beam.

Aspect 6: The method of any of Aspects 1-5, further comprising: receiving an indication that the beam switching pattern is to be activated for communicating with the base station.

Aspect 7: The method of any of Aspects 1-6, further comprising: transmitting a request to activate the beam switching pattern; and receiving an indication that the beam switching pattern is to be activated for communicating with the base station based at least in part on transmitting the request.

Aspect 8: The method of any of Aspects 1-5, further comprising: determining, based at least in part on one or more rules, that the beam switching pattern is to be activated for communicating with the base station.

Aspect 9: The method of any of Aspects 1-5 or 8, wherein the beam switching pattern is to be used after a time period from an activation event for the beam switching pattern.

Aspect 10: The method of Aspect 9, wherein the activation event is reception of downlink control information activating the beam switching pattern.

Aspect 11: The method of Aspect 9, wherein the activation event is transmission of acknowledgment feedback for a medium access control control element (MAC-CE) activating the beam switching pattern.

Aspect 12: The method of any of Aspects 1-11, wherein one or more operations of the UE are to be performed independently of different beams used for the beam switching pattern.

Aspect 13: The method of any of Aspects 1-11, wherein one or more operations of the UE are to be respectively performed for different beams used for the beam switching pattern.

Aspect 14: The method of any of Aspects 1-13, wherein a particular beam used for the beam switching pattern is a default beam.

Aspect 15: The method of Aspect 14, wherein the default beam is to be used when an inactivity timer expires or at a configured time.

Aspect 16: The method of any of Aspects 1-15, further comprising: receiving an indication of a beam that is to be used for receiving a downlink data communication; and receiving the downlink data communication using the beam, or using another beam according to the beam switching pattern, based at least in part on whether a scheduling offset associated with the downlink data communication satisfies a threshold value.

Aspect 17: The method of any of Aspects 1-16, further comprising: receiving an indication of a beam that is to be used for receiving a downlink control communication; and receiving the downlink control communication using the beam, or using another beam according to the beam switching pattern, based at least in part on whether a time period for transmitting acknowledgment feedback for the indication satisfies a threshold value.

Aspect 18: The method of any of Aspects 1-17, further comprising: receiving downlink control information that includes an indicator, in a transmission configuration indicator field, that indicates whether the beam switching pattern or a particular beam is to be used for communicating with the base station.

Aspect 19: The method of any of Aspects 1-18, wherein communicating with the base station comprises: communicating with the base station using a default beam when an inactivity timer expires or at a configured time.

Aspect 20: A method of wireless communication performed by a base station, comprising: transmitting, to a user equipment (UE), information indicating a beam switching pattern that indicates beams that are to be used by the UE on a per communication basis in a time domain; and communicating with the UE based at least in part on transmitting the information indicating the beam switching pattern.

Aspect 21: The method of Aspect 20, wherein the information indicating the beam switching pattern indicates a list of beam indications that are to be respectively used for communications in the time domain.

Aspect 22: The method of any of Aspects 20-21, further comprising: receiving a request to use the beam switching pattern, wherein the information indicating the beam switching pattern is transmitted based at least in part on receiving the request to use the beam switching pattern.

Aspect 23: The method of any of Aspects 20-22, wherein the information indicating the beam switching pattern indicates one or more rules to enable the UE to determine a particular beam that is to be used for a particular communication.

Aspect 24: The method of any of Aspects 20-23, wherein the information indicating the beam switching pattern indicates that a set of communications are to use a same beam.

Aspect 25: The method of any of Aspects 20-24, further comprising: transmitting an indication that the beam switching pattern is to be activated by the UE for communicating with the base station.

Aspect 26: The method of any of Aspects 20-25, further comprising: receiving a request to activate the beam switching pattern; and transmitting an indication that the beam switching pattern is to be activated by the UE for communicating with the base station based at least in part on receiving the request.

Aspect 27: The method of any of Aspects 20-24, further comprising: transmitting one or more rules that the UE is to use for determining that the beam switching pattern is to be activated by the UE for communicating with the base station.

Aspect 28: The method of any of Aspects 20-24 or 27, wherein the beam switching pattern is to be used by the UE after a time period from an activation event for the beam switching pattern.

Aspect 29: The method of Aspect 28, wherein the activation event is reception by the UE of downlink control information activating the beam switching pattern.

Aspect 30: The method of Aspect 28, wherein the activation event is transmission by the UE of acknowledgment feedback for a medium access control control element (MAC-CE) activating the beam switching pattern.

Aspect 31: The method of any of Aspects 20-30, wherein one or more operations of the UE are to be performed independently of different beams used for the beam switching pattern.

Aspect 32: The method of any of Aspects 20-30, wherein one or more operations of the UE are to be respectively performed for different beams used for the beam switching pattern.

Aspect 33: The method of any of Aspects 20-32, wherein a particular beam used for the beam switching pattern is a default beam.

Aspect 34: The method of Aspect 33, wherein the default beam is to be used by the UE when an inactivity timer expires or at a configured time.

Aspect 35: The method of any of Aspects 20-34, further comprising: transmitting an indication of a beam that is to be used by the UE for receiving a downlink data communication; and transmitting the downlink data communication according to the beam, or according to the beam switching pattern, based at least in part on whether a scheduling offset associated with the downlink data communication satisfies a threshold value.

Aspect 36: The method of any of Aspects 20-35, further comprising: transmitting an indication of a beam that is to be used by the UE for receiving a downlink control communication; and transmitting the downlink control communication according to the beam, or according to the beam switching pattern, based at least in part on whether a time period for transmitting acknowledgment feedback for the indication satisfies a threshold value.

Aspect 37: The method of any of Aspects 20-36, further comprising: transmitting downlink control information that includes an indicator, in a transmission configuration indicator field, that indicates whether the beam switching pattern or a particular beam is to be used by the UE for communicating with the base station.

Aspect 38: The method of any of Aspects 20-37, wherein communicating with the UE comprises: communicating with the UE using a default beam when an inactivity timer expires or at a configured time.

Aspect 39: An apparatus for wireless communication at a device, comprising a processor; memory coupled with the processor; and instructions stored in the memory and executable by the processor to cause the apparatus to perform the method of one or more Aspects of Aspects 1-19.

Aspect 40: A device for wireless communication, comprising a memory and one or more processors coupled to the memory, the memory and the one or more processors configured to perform the method of one or more Aspects of Aspects 1-19.

Aspect 41: An apparatus for wireless communication, comprising at least one means for performing the method of one or more Aspects of Aspects 1-19.

Aspect 42: A non-transitory computer-readable medium storing code for wireless communication, the code comprising instructions executable by a processor to perform the method of one or more Aspects of Aspects 1-19.

Aspect 43: A non-transitory computer-readable medium storing a set of instructions for wireless communication, the set of instructions comprising one or more instructions that, when executed by one or more processors of a device, cause the device to perform the method of one or more Aspects of Aspects 1-19.

Aspect 44: An apparatus for wireless communication at a device, comprising a processor; memory coupled with the processor; and instructions stored in the memory and executable by the processor to cause the apparatus to perform the method of one or more Aspects of Aspects 20-38.

Aspect 45: A device for wireless communication, comprising a memory and one or more processors coupled to the memory, the memory and the one or more processors configured to perform the method of one or more Aspects of Aspects 20-38.

Aspect 46: An apparatus for wireless communication, comprising at least one means for performing the method of one or more Aspects of Aspects 20-38.

Aspect 47: A non-transitory computer-readable medium storing code for wireless communication, the code comprising instructions executable by a processor to perform the method of one or more Aspects of Aspects 20-38.

Aspect 48: A non-transitory computer-readable medium storing a set of instructions for wireless communication, the set of instructions comprising one or more instructions that, when executed by one or more processors of a device, cause the device to perform the method of one or more Aspects of Aspects 20-38.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE), comprising:
a transceiver;
a memory comprising instructions; and
one or more processors configured to execute the instructions and cause the UE to:
receive, via the transceiver, information indicating a beam switching pattern that indicates a set of beams that are to be used by the UE on a per communication basis in a time domain, the information further indicating one or more rules, the one or more rules indicating that a set of communications are to use a same beam based at least in part on a scheduling configuration;
select a beam of the set of beams based at least in part on the one or more rules; and
communicate, via the transceiver and via the beam, the communication comprising a transmission or a reception of a message.

2. The UE of claim 1, wherein the one or more processors are further configured to cause the UE to:
transmit, via the transceiver, a request to use the beam switching pattern,
wherein the information indicating the beam switching pattern is received based at least in part on transmitting the request to use the beam switching pattern.

3. The UE of claim 1, wherein the one or more processors are further configured to cause the UE to:
receive, via the transceiver, an indication that the beam switching pattern is to be activated.

4. The UE of claim 1, wherein the one or more processors are further configured to cause the UE to:
transmit, via the transceiver, a request to activate the beam switching pattern; and
receive, via the transceiver, an indication that the beam switching pattern is to be activated based at least in part on transmitting the request.

5. The UE of claim 1, wherein the one or more processors are further configured to cause the UE to:
activate, based at least in part on one or more activation rules, the beam switching pattern.

6. The UE of claim 1, wherein the beam switching pattern is to be used after a time period from an activation event for the beam switching pattern.

7. The UE of claim 1, wherein the one or more processors are further configured to cause the UE to:
perform one or more operations of the UE independently of different beams used for the beam switching pattern.

8. The UE of claim 1, wherein the one or more processors are further configured to cause the UE to:
perform one or more respective operations of the UE for different beams used for the beam switching pattern.

9. The UE of claim 1, wherein the one or more processors, to communicate via the beam, are configured to cause the UE to:
communicate, via the transceiver, based at least in part on receiving the information and also by using a default beam when an inactivity timer expires or at a configured time.

10. The UE of claim 1, wherein the one or more processors are further configured to cause the UE to:
receive, via the transceiver, an indication of a second beam; and
receive, via the transceiver, a downlink data communication using the second beam or using a third beam according to the beam switching pattern,
wherein the second beam or the third beam is used based at least in part on whether a scheduling offset associated with the downlink data communication satisfies a threshold value.

11. The UE of claim 1, wherein the one or more processors are further configured to cause the UE to:
receive, via the transceiver, an indication of a second beam; and receive, via the transceiver, a downlink control communication using the second beam or using a third beam according to the beam switching pattern,
    wherein the second beam or the third beam is used based at least in part on whether a time period for transmitting acknowledgment feedback for the indication satisfies a threshold value.

12. A base station, comprising:
a transceiver;
a memory comprising instructions; and
one or more processors configured to execute the instructions and cause the base station to:
    transmit, via the transceiver, information indicating a beam switching pattern that indicates a set of beams that are to be used on a per communication basis in a time domain, the information further indicating one or more rules, the one or more rules indicating that a set of communications are to use a same beam based at least in part on a scheduling configuration;
    select a beam of the set of beams based at least in part on the one or more rules; and
    communicate, via the transceiver and via the beam, the communication comprising a transmission or a reception of a message.

13. The base station of claim 12, wherein the one or more processors are further configured to cause the base station to:
    receive, via the transceiver, a request to use the beam switching pattern,
        wherein the information indicating the beam switching pattern is transmitted based at least in part on receiving the request to use the beam switching pattern.

14. The base station of claim 12, wherein the one or more processors are further configured to cause the base station to:
    transmit an indication that the beam switching pattern is to be activated for communicating with the base station.

15. The base station of claim 12, wherein the one or more processors are further configured to cause the base station to:
    receive, via the transceiver, a request to activate the beam switching pattern; and
    transmit, via the transceiver, an indication that the beam switching pattern is to be activated for communicating with the base station based at least in part on receiving the request.

16. The base station of claim 12, wherein the beam switching pattern is to be used after a time period from an activation event for the beam switching pattern.

17. The base station of claim 12, wherein the one or more processors, to communicate via the beam, are configured to cause the base station to:
    communicate, via the transceiver, based at least in part on transmitting the information and also by using a default beam when an inactivity timer expires or at a configured time.

18. The base station of claim 12, wherein the one or more processors are further configured to cause the base station to:
    transmit, via the transceiver, an indication of a second beam; and
    transmit, via the transceiver, a downlink data communication according to the second beam or according to the beam switching pattern,
        wherein the downlink data communication is transmitted according to the second beam or according to the beam switching pattern based at least in part on whether a scheduling offset associated with the downlink data communication satisfies a threshold value.

19. The base station of claim 12, wherein the one or more processors are further configured to cause the base station to:
    transmit, via the transceiver, an indication of a second beam; and
    transmit, via the transceiver, a downlink control communication according to the second beam or according to the beam switching pattern,
        wherein the downlink control communication is transmitted according to the second beam or according to the beam switching pattern based at least in part on whether a time period for transmitting acknowledgment feedback for the indication satisfies a threshold value.

20. A method of wireless communication performed at a user equipment (UE), comprising:
    receiving information indicating a beam switching pattern that indicates a set of beams that are to be used by the UE on a per communication basis in a time domain, the information further indicating one or more rules, the one or more rules indicating that a set of communications are to use a same beam based at least in part on a scheduling configuration;
    selecting a beam of the set of beams based at least in part on the one or more rules; and
    communicating via the beam, the communication comprising a transmission or a reception of a message.

21. The method of claim 20, further comprising:
    transmitting a request to use the beam switching pattern,
        wherein the information indicating the beam switching pattern is received based at least in part on transmitting the request to use the beam switching pattern.

22. The method of claim 20, further comprising:
    receiving an indication that the beam switching pattern is to be activated.

23. The method of claim 20, further comprising:
    transmitting a request to activate the beam switching pattern; and
    receiving an indication that the beam switching pattern is to be activated based at least in part on transmitting the request.

24. A method of wireless communication performed at a base station, comprising:
    transmitting information indicating a beam switching pattern that indicates a set of beams that are to be used on a per communication basis in a time domain, the information further indicating one or more rules, the one or more rules indicating that a set of communications are to use a same beam based at least in part on a scheduling configuration;
    selecting a beam of the set of beams based at least in part on the one or more rules; and
    communicating via the beam, the communication comprising a transmission or a reception of a message.

25. The method of claim 24, further comprising:
    transmitting an indication that the beam switching pattern is to be activated for communicating with the base station.

26. The method of claim 24, further comprising:
    receiving a request to activate the beam switching pattern; and
    transmitting an indication that the beam switching pattern is to be activated for communicating with the base station based at least in part on receiving the request.

27. The method of claim 20, further comprising:
    activating the beam switching pattern based at least in part on one or more activation rules.

28. The method of claim 20, wherein the beam switching pattern is to be used after a time period from an activation event for the beam switching pattern.

29. The method of claim 20, further comprising:
performing one or more operations of the UE independently of different beams used for the beam switching pattern.

30. The method of claim 20, further comprising:
performing one or more respective operations of the UE for different beams used for the beam switching pattern.

* * * * *